(12) United States Patent
Coulon et al.

(10) Patent No.: US 7,874,054 B2
(45) Date of Patent: Jan. 25, 2011

(54) METHOD FOR PRODUCING TUBULAR COMPONENT PROVIDED WITH MUTUALLY ORIENTED THREADED ELEMENTS

(75) Inventors: Jean-Luc Coulon, Monceau Saint Waast (FR); Jean-Claude Micmande, Aulnoye-Aymeries (FR)

(73) Assignee: Vallourec Mannesmann Oil & Gas France, Aulnoye-Aymeries (FR)

( * ) Notice: Subject to any disclaimer, the term of this patent is extended or adjusted under 35 U.S.C. 154(b) by 987 days.

(21) Appl. No.: 10/574,285

(22) PCT Filed: Sep. 22, 2004

(86) PCT No.: PCT/EP2004/010656

§ 371 (c)(1),
(2), (4) Date: Mar. 6, 2007

(87) PCT Pub. No.: WO2005/040657

PCT Pub. Date: May 6, 2005

(65) Prior Publication Data

US 2007/0222215 A1    Sep. 27, 2007

(30) Foreign Application Priority Data

Oct. 1, 2003    (FR) .................................. 03 11509

(51) Int. Cl.
*B23Q 17/00*    (2006.01)
*B23P 13/00*    (2006.01)
*F16L 15/00*    (2006.01)

(52) U.S. Cl. .............. 29/407.01; 29/407.05; 29/407.09; 285/93; 138/104

(58) Field of Classification Search .............. 29/407.01, 29/407.05, 407.09, 407.1, 525.01, 557, 445; 285/93, 333; 138/104
See application file for complete search history.

(56) References Cited

U.S. PATENT DOCUMENTS

| 4,127,927 A | 12/1978 | Hauk et al. |
| 4,962,579 A | 10/1990 | Moyer et al. |
| 5,233,742 A | 8/1993 | Gray et al. |
| 5,307,549 A * | 5/1994 | Tsutsumi et al. ............ 29/27 C |
| 6,363,598 B1 | 4/2002 | Staudt et al. |
| 2005/0072483 A1 | 4/2005 | Rioufol et al. |

FOREIGN PATENT DOCUMENTS

| EP | 1 382 793 | 1/2004 |
| FR | 2 559 580 | 8/1985 |

* cited by examiner

*Primary Examiner*—Jermie E Cozart
(74) *Attorney, Agent, or Firm*—Oblon, Spivak, McClelland, Maier & Neustadt, L.L.P.

(57) ABSTRACT

A method for producing a tubular component, in which, after machining successively respective threaded elements at both ends of the tubular component, a second orientation gauge is screwed onto the second threaded element to check whether a mark on the gauge comes into alignment with an orientation mark that has been drawn on the component, after the first element has been machined and a first orientation gauge has been screwed onto the first element in axial alignment with a mark provided on this gauge. If not, the machining of the second element is repeated with parameters varied accordingly. Such a method may find particular application to the drilling and operation of hydrocarbon wells.

8 Claims, 1 Drawing Sheet

US 7,874,054 B2

METHOD FOR PRODUCING TUBULAR COMPONENT PROVIDED WITH MUTUALLY ORIENTED THREADED ELEMENTS

FIELD OF THE INVENTION

The invention relates to a method for producing a tubular component provided at each of its two ends with a threaded element comprising a male or female thread and a makeup stop abutment that can form part of a string of tubular components in which two consecutive components are mutually assembled by making up the male thread of one threaded element of one component into the female thread of one threaded element of the other component, the corresponding stop abutments coming into mutual bearing contact, the method comprising the following steps:

a) mounting the component in the chuck of a lathe;
b) machining a first threaded element at one end of the component using the lathe;
c) revolving the component in the lathe chuck; and
d) machining a second threaded element at the other end of the component using the lathe, using a machining tool that is displaced with respect to the frame of the lathe in accordance under the control of a program, from a given position.

Said method can be applied to either a long length tubular component such as a pipe or a short length tubular component such as a coupling.

DISCUSSION OF THE BACKGROUND

Strings of tubular components such as those mentioned above are in routine use as tubular strings for drilling or exploration of hydrocarbon wells.

The usual methods for machining the tubular components of such strings cannot guarantee that a given generatrix of a component will come into alignment with a given generatrix of another component after assembling the two components by abutting makeup.

Such a coincidence is necessary when the components receive elongate accessories along their generatrices which have to be aligned from one component to the next, for example to form control lines or strings of cables.

U.S. Pat. No. 6,363,598 describes a method for producing a string of tubular components alternately composed of great length pipes each provided with a male threaded element with a tapered thread at each end and with short length couplings each provided with a female threaded element with a tapered thread at each end, each male threaded element being screwed up into abutting contact into a female threaded element, in which method orientation marks made on the components come into mutual alignment.

That known method necessitates a variety of successive machining operations being carried out on each threaded element: removing an end portion of the element, machining an internal shoulder in the case of a female threaded element, machining a tapered surface, then threading. Those operations must be carried out using parameters common to all of the components of the string. That document does not describe the production of great length pipes each provided with a male threaded element at one end and a female threaded element at the other end.

SUMMARY OF THE INVENTION

The aim of the invention is to allow the components of a string of tubular components to be aligned correctly, overcoming the limitations of the known method.

In particular, the invention relates to a method of the type defined in the introduction, and provides that:

between steps b) and c):

e) a first orientation gauge is screwed onto the first threaded element, the gauge comprising a thread that matches that of the first threaded element and a makeup stop abutment and having a mark on its external periphery, to bring the stop abutments of the threaded element and the orientation gauge into mutual bearing contact;

f) an orientation mark axially aligned with the mark on the orientation gauge is drawn on the external periphery of the component;

during step c), the component is so disposed that its orientation mark is located in the same angular position with respect to the chuck as in step f);

during step d), the starting position of the tool is defined after at least one preliminary test in which steps a), b), e), f), c) and d) are followed by the following steps:

g) a second orientation gauge comprising a thread matching that of the second threaded element and a makeup stop abutment and having a mark on its external periphery is screwed onto the second threaded element to bring the stop abutments of the threaded element and the orientation gauge into mutual bearing contact;

the second orientation gauge used during step g) being the first orientation gauge if the threads of the first and second threaded elements are both male or both female or being of a matching type to the first orientation gauge and having its mark axially aligned with the mark of the first orientation gauge when the first and second orientation gauges are screwed into abutment if one of the threaded elements is male and the other is female; and h) the angular offset between the marks on the component and the orientation gauge is compared with a predefined set value Q and the new starting position of the machining tool is defined as being axially offset with respect to the initial position by a quantity determined as a function of the direction and amplitude of any deviation.

The set value Q can be defined experimentally as a function of a variety of parameters, such as the makeup torque and the quantity of grease.

In the present description, the term "mark" or "orientation mark" means a mark placed on an object having a general form of revolution to mark a particular generatrix of that object. Such a mark can take the form of a line drawn along said generatrix on a peripheral surface of the object. Marking can be accomplished by depositing ink or any other substance leaving a durable trace, or by scarification using a sharp point. The term "angular offset" designates an angular distance between two elements, for example "marks", about an axis of revolution. The term "deviation" or "angular deviation" denotes the difference between the established angular offset and a set value established therefor.

Optional complementary or alternative characteristics of the invention are mentioned below:

the axial offset of the starting position of the machining tool comprises a quantity:

$$C = P \times \frac{\alpha + Q}{2\pi}$$

P being the thread pitch and α being the value of said deviation measured in radians;

said quantity C is calculated using the formula:

$$C = \frac{P}{\pi} \times \left(\frac{B}{D} + \frac{Q}{2}\right)$$

B being the length of the subtending circular arc on a peripheral surface of the component with diameter D, between the mark thereon and the axial half-plane containing the mark of the orientation gauge, said arc having a value of α radians.

Q is determined so that during mutual makeup of tubular components, the angular offset between the corresponding marks is 10° or less, preferably 5° or less.

the orientation mark of the component comprises a first elementary mark drawn in the axial alignment of the mark of the orientation gauge in the region of the first threaded element, and a second elementary mark then drawn in the same angular position as the first elementary mark in the region of the second threaded element;

the first threaded element comprises a male thread;

the tubular component comprises a great length pipe provided at each end with a male threaded element and a short coupling provided at each end with a female threaded element, a male threaded element being made up into position in a female threaded element of the coupling;

the tubular component is a great length pipe provided at one end with a male threaded element and at the other end with a female threaded element;

the two ends of the tubular component are provided with threaded elements of the same type;

The invention also pertains to a string formed from tubular components as can be obtained by the method defined above, in which two consecutive components are mutually assembled by making up the male thread of one threaded element of one component into the female thread of one threaded element of the other component, the corresponding stop abutments coming into mutual bearing contact, said components having respective orientation marks on their external periphery the angular offset of which does not exceed 10° between two consecutive components.

The invention also pertains to a tubular component provided at its two ends with threaded elements comprising a male thread and a female thread respectively and respective makeup stop abutments, as can be obtained by the same method, having an orientation mark on its external periphery and in which said threaded elements are machined so that when its male thread is made up into the female thread of an identical tubular component by bringing the corresponding stop abutments into mutual bearing contact, the angular offset between the orientation marks of the two components does not exceed 10°.

Advantageously, in the string and in the tubular component of the invention, said angular offset does not exceed 5°.

BRIEF DESCRIPTION OF THE DRAWINGS

The charactersitcs and advantages of the invention will be described in more detail in the description below, made with reference to the accompanying drawings.

DETAILED DESCRIPTION OF THE PREFERED EMBODIMENTS

In order to carry out the method, at least one orientation gauge is required, and two respectively male and female orientation gauges if a tubular component provided with respective female and male threaded elements is to be produced.

Figure 1:
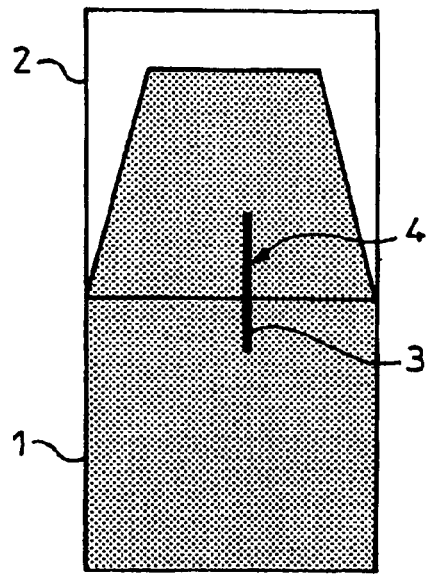
FIG. 1 diagrammatically shows the male and female orientation gauges for use in the method of the invention, screwed one into the other, with their respective stop abutments in mutual bearing contact.

Two such orientation gauges are shown in FIG. 1, namely a male gauge 1 and a female gauge 2, provided with respective marks 3, 4 in the form of lines each extending along a generatrix of the external peripheral surface of the corresponding gauge. Said gauges have been described in detail in FR-A-2 559 580, reference to which should be made for a more complete description. As can be seen, when the stop abutments of the two gauges are in mutual bearing contact, marks 3 and 4 come into mutual alignment, i.e., they are in the same half-plane defined by the axis of the threads.

Figure 2:
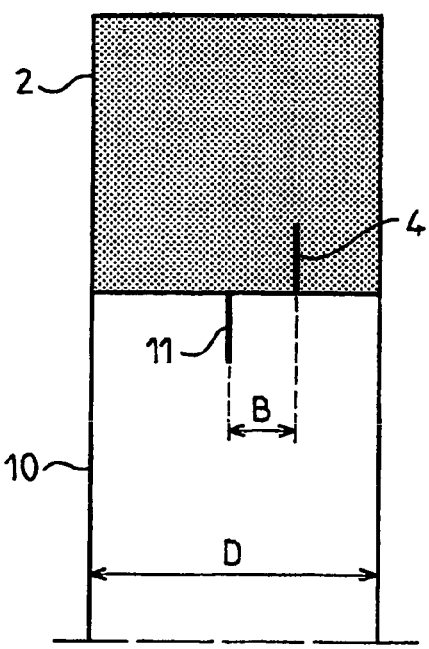
FIG. 2 diagrammatically shows one of the orientation gauges of FIG. 1 screwed onto a threaded element that has just been machined, in step g) of the method.

FIG. 2 diagrammatically shows one of the orientation gauges of FIG. 1 screwed onto a corresponding threaded element machined in step d) of the method of the invention during a prior test, for example the female gauge 2 onto a male threaded element machined at one end of a tubular component 10. In step f), an orientation mark 11 has been drawn on the component 10, aligned with the mark 3 of the gauge 1 or with the mark 4 of the gauge 2 depending on whether the threaded element (not shown) machined in step b) has a male or female thread at the opposite end of component 10.

In the remainder of the description, it will be assumed that the set value Q for the angular offset between the marks on the component and the orientation gauge equals 0. It should be clear, however, that this value may differ from 0 and can, for example, depend on the torque applied during makeup of the tubular components to form a string, in particular in the case of tapered threads with a radial interference fit, and/or on the quantity of grease introduced into the threaded connections. The value of Q can be determined by prior tests, by comparing the angular offset obtained between two components at the end of mutual makeup with that observed between one of said components and the corresponding orientation gauge in step g) of the method.

In the case shown, the mark 4 of gauge 2 is separated from the mark 11 by a circular arc of length B measured along the external circumference of the component 10 with diameter D, that arc length corresponding to an arc of α radians, where α=2B/D. Marks 4 and 11 are thus offset from each other by an angle α.

In view of the offset α, step d) has to be repeated, axially offsetting the starting position of the tool by a quantity $$C = P \times \frac{\alpha + Q}{2\pi}$$

When that step has been repeated, repeating step g) will normally show that the angular offset α is zero if Q=0 or in general, equal to the absolute value of Q.

The tubular components can then be machined using the starting point thus defined, without steps g) and h) being necessary.

It can be seen in FIG. 2 that the mark 11 extends over a short length of component 10 close to the threaded element machined second. It is in fact a second elementary mark which has been drawn in axial alignment with a first elementary mark, not shown, itself drawn close to the threaded element machined first, in step b). It is actually inconvenient to draw an orientation mark extending to the region of the second threaded element directly onto a great length tubular component in alignment with the mark on the orientation gauge used in step e) and f). To determine the position of the second elementary mark, the following procedure can be used, for example. A dial gauge can be used to locate the highest point of a circumference of the tubular component crossed by the first elementary mark. The component is turned in the chuck to bring the first elementary mark to face the tip of the dial gauge. Keeping this orientation of the component, as before, the highest point of a circumference of the tubular component which has to be crossed by the second elementary mark is located, and the mark is drawn along the generatrix on which the tip of the dial gauge bears, which is thus in axial alignment with the first elementary mark. Clearly, any other suitable method that can associate distant points of the same generatrix can be used, for example a bubble level to locate the upper generatrix or a plumb line to locate a generatrix located at the mid-height of the component. The dial gauge can also be used to mark the lowest point of the circumference or the extreme left or right point, as viewed along the longitudinal axis of the component.

The tubular component of the invention can be:
- a great length pipe provided at one end with a male threaded element and with a female threaded element at the other end;
- a great length pipe provided at both ends with threaded elements of the same type, i.e. both male or both female;
- a coupling both ends of which are provided with threaded elements of the same type, for example female elements;
- an assembly formed by such a pipe and such a coupling.

The tubular component of the invention, provided at its two ends with threaded elements comprising a male thread and a female thread respectively and with respective makeup stop abutments and having an orientation mark on its external periphery, is characterized in that said threaded elements are machined so that when their male thread is made up into the female thread of an identical tubular component, bringing the corresponding stop abutments Into mutual bearing contact, the angular offset between the orientation marks of the two components does not exceed 10°. Such machining of the threaded elements implies a set disposition of the threads with respect to the stop abutments.

The transverse cross section of a thread in a plane perpendicular to its axis is a closed curve; it minimum distance from the axis corresponds to the radius of the thread root for a male thread or to the radius of the thread crest for a female thread, and its maximum distance from the axis corresponds to the radius of the thread crest for a male thread or to the radius of the thread root for a female thread. When a male thread is made up into a mating female thread, their transverse cross sections in the same plane are substantially coincident.

Figure 3:
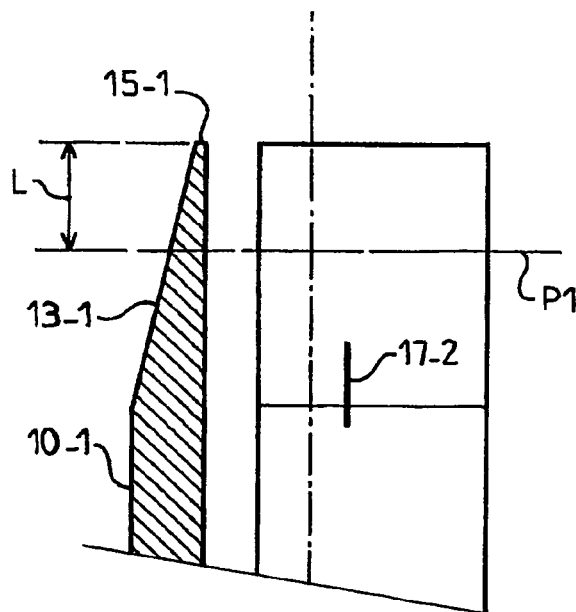
FIG. 3 diagrammatically shows two tubular components, mutually assembled by makeup.
Figure 3:
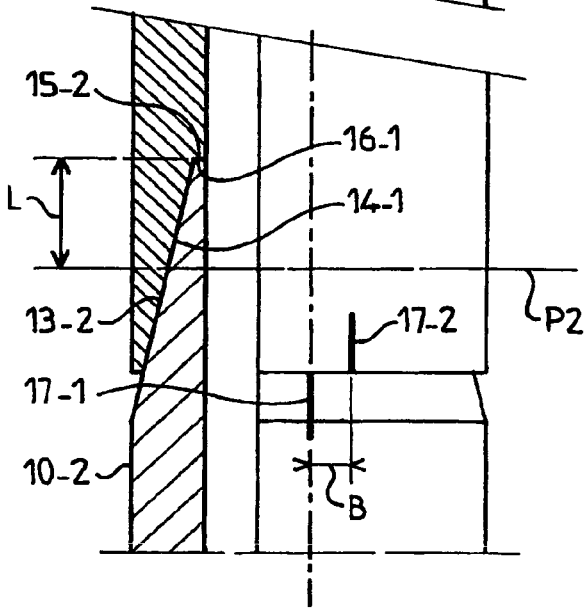

FIG. 3 partially shows two identical tubular components 10-1 and 10-2 represented in cross section on the left hand side of the figure. The component 10-1 comprises a male thread 13-1 at one end and a female thread 14-1 at its other end, into which the male thread 13-2 of the component 10-2 is made up until the makeup stop abutments 16-1 and 15-2 associated respectively with threads 14-1 and 13-2 come into mutual bearing contact. The orientation marks 17-1 and 17-2 drawn on components 10-1 and 10-2 respectively are then mutually offset by a circumferential distance B corresponding to an angular offset α.

As indicated above, the transverse cross sections of the threads 14-1 and 13-2 in an arbitrary plane P2 located at an axial distance L from abutments 16-1 and 15-2 are substantially coincident. Since the two components are identical, the transverse cross section of the thread 13-1 in the plane P1 located at an axial distance L from the abutment 15-1 associated with the thread 13-1, homologous with the transverse cross section of the thread 13-2 in the plane P2, is offset with respect to the latter by the same angle α as the mark 17-2 with respect to the mark 17-1. This angular offset α is also that of the transverse cross section of the thread 13-1 in the plane P1 with respect to the transverse cross section in the plane P2 of the thread 14-1, which substantially coincides with that of the thread 13-2. Thus, in order for the angular offset between the marks 17-1 and 17-2 not to exceed 10° and thus for the component 10-1 to be in accordance with the invention, the angular offset between the transverse cross sections of the male and female threads 13-1 and 14-1 in the radial planes P1 and P2 located at the same arbitrary distance L from the stop abutments 15-1 and 16-1 respectively associated therewith must not exceed 10°.

The invention claimed is:

1. A method for producing a tubular component provided at each of its two ends with a threaded element including a male or female thread and a makeup stop abutment that can form part of a string of tubular components in which two consecutive components are mutually assembled by connecting the male thread of one threaded element of one component into the female thread of one threaded element of another component, the corresponding stop abutments coming into mutual bearing contact, the method comprising:
  a) mounting the component in a chuck of a lathe;
  b) machining a first threaded element at one end of the component using the lathe;
  c) screwing a first orientation gauge onto the first threaded element, the gauge including a thread that matches that of the first threaded element and a makeup stop abutment and having a mark on its external periphery, to bring the stop abutments of the threaded element and the orientation gauge into mutual bearing contact;
  d) drawing an orientation mark axially aligned with the mark on the orientation gauge on the external periphery of the component;
  e) revolving the component in the lathe chuck during which the component is so disposed that its orientation mark is located in the same angular position with respect to the chuck as in the drawing (d);
  f) machining a second threaded element at the other end of the component by the lathe, using a machining tool that is displaced with respect to the frame of the lathe under the control of a program, from a given position during which the starting position of the tool is defined after at least one preliminary test;
  g) screwing a second orientation gauge including a thread matching that of the second threaded element and a makeup stop abutment and having a mark on its external periphery onto the second threaded element to bring the stop abutments of the threaded element and the orientation gauge into mutual bearing contact,
  the orientation gauge used during the screwing g) being the first orientation gauge if the threads of the first and second threaded elements are both male or both female, or being of a matching type to the first orientation gauge and having its mark axially aligned with the mark of the first orientation gauge when the first and second orientation gauges are screwed into abutment if one of the threaded elements is male and the other is female; and h) comparing an angular offset between the marks on the component and the orientation gauge with a pre-defined set value Q and a new starting position of the machining tool is defined as being axially offset with respect to the initial position by a quantity determined as a function of the direction and amplitude of any existing deviation.

2. A method according to claim 1, wherein the axial offset of the starting position of the machining tool comprises a quantity:

$$C = P \times \frac{\alpha + Q}{2\pi}$$

P being the thread pitch and $\alpha$ being the value of said deviation measured in radians.

3. A method according to claim 2, wherein the quantity C is calculated using the formula:

$$C = \frac{P}{\pi} \times \left(\frac{B}{D} + \frac{Q}{2}\right)$$

B being the length of the subtending circular arc on a peripheral surface of the component with diameter D, between the mark thereon and the axial half-plane containing the mark of the orientation gauge, the arc having a value of a radians.

4. A method according to claim 1, wherein the orientation mark of the component comprises a first elementary mark drawn in axial alignment of the mark of the orientation gauge in the region of the first threaded element, and a second elementary mark then drawn in the same angular position as the first elementary mark in the region of the second threaded element.

5. A method according to claim 1, wherein the first threaded element comprises a male thread.

6. A method according to claim 1, wherein the tubular component comprises a great length pipe provided at each end with a male threaded element and a short coupling provided at each end with a female threaded element, a male threaded element being connected into position in a female threaded element of the coupling.

7. A method according to claim 1, wherein the tubular component is a great length pipe provided at one end with a male threaded element and at the other end with a female threaded element.

8. A method according to claim 1, wherein the two ends of the tubular component are provided with threaded elements of the same type.

* * * * *